(12) United States Patent
Kakeno et al.

(10) Patent No.: US 9,490,494 B2
(45) Date of Patent: Nov. 8, 2016

(54) FUEL CELL SYSTEM

(75) Inventors: Yuji Kakeno, Nisshin (JP); Hideaki Mizuno, Owariasahi (JP); Kenji Umayahara, Miyoshi (JP); Yoshiaki Naganuma, Toyota (JP); Masashi Toida, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 142 days.

(21) Appl. No.: 14/399,012

(22) PCT Filed: May 7, 2012

(86) PCT No.: PCT/JP2012/061685
§ 371 (c)(1),
(2), (4) Date: Nov. 5, 2014

(87) PCT Pub. No.: WO2013/168218
PCT Pub. Date: Nov. 14, 2013

(65) Prior Publication Data
US 2015/0325896 A1    Nov. 12, 2015

(51) Int. Cl.
*H02J 7/00* (2006.01)
*H01M 8/04* (2016.01)
*H01M 16/00* (2006.01)
(Continued)

(52) U.S. Cl.
CPC .......... *H01M 8/04865* (2013.01); *B60L 1/003* (2013.01); *B60L 3/0053* (2013.01); *B60L 7/14* (2013.01); *B60L 11/1803* (2013.01); *B60L 11/1861* (2013.01); *B60L 11/1887* (2013.01); *B60L 15/2009* (2013.01); *H01M 8/04544* (2013.01); *H01M 8/10* (2013.01); *H01M 16/006* (2013.01); *H02J 1/00* (2013.01); *H02J 7/007* (2013.01); *H02J 7/0052* (2013.01);
*H02J 7/34* (2013.01); *B60L 2210/14* (2013.01); *B60L 2240/12* (2013.01); *B60L 2240/14* (2013.01); *B60L 2240/421* (2013.01); *B60L 2240/423* (2013.01); *B60L 2240/547* (2013.01); *H01M 2008/1095* (2013.01); *H01M 2250/20* (2013.01); *H02J 2001/004* (2013.01); *Y02E 60/50* (2013.01); *Y02T 10/645* (2013.01); *Y02T 10/705* (2013.01); *Y02T 10/7044* (2013.01);
(Continued)

(58) Field of Classification Search
CPC ..... B60L 11/1881; H01M 8/00; H01M 8/10; H01M 8/14; H01M 8/22; H02J 7/00
USPC ................... 320/101–104, 107–109
See application file for complete search history.

(56) References Cited

U.S. PATENT DOCUMENTS

2008/0238355 A1*  10/2008  Muramatsu ........... B60L 11/185
                                                    320/101
2009/0029197 A1    1/2009  Hibino et al.
2015/0280477 A1*  10/2015  Kusumoto ............... H02J 7/00
                                                    320/101

FOREIGN PATENT DOCUMENTS

JP    2007-005038 A    1/2007
JP    2007-220323 A    8/2007

*Primary Examiner* — Paul Dinh
(74) *Attorney, Agent, or Firm* — Andrews Kurth Kenyon LLP

(57) ABSTRACT

If a required voltage which corresponds to a required power has reached a boundary voltage, which is an oxidation-reduction potential of platinum, which constitutes a catalyst of a fuel cell, the fuel cell system performs crossover-avoidance control that holds an FC instruction voltage for the fuel cell at the boundary voltage, and absorbs the gap between the required voltage and the FC instruction voltage by using a secondary battery.

4 Claims, 3 Drawing Sheets

(51) Int. Cl.
*H02J 1/00* (2006.01)
*H02J 7/34* (2006.01)
*B60L 1/00* (2006.01)
*B60L 3/00* (2006.01)
*B60L 7/14* (2006.01)
*B60L 11/18* (2006.01)
*B60L 15/20* (2006.01)
*H01M 8/10* (2016.01)

(52) U.S. Cl.
CPC .......... *Y02T10/7225* (2013.01); *Y02T 10/7275* (2013.01); *Y02T 90/32* (2013.01); *Y02T 90/34* (2013.01)

FUEL CELL SYSTEM

CROSS-REFERENCE TO RELATED APPLICATIONS

This is a national phase application based on the PCT International Patent Application No. PCT/JP2012/061685 filed May 7, 2012, the entire contents of which are incorporated herein by reference.

TECHNICAL FIELD

The present invention relates to a fuel cell system.

BACKGROUND ART

A typical fuel cell has a structure in which a membrane-electrode assembly (MEA) is sandwiched by separators, each having a flow path for supplying raw materials, the MEA having a fuel electrode catalyst layer provided on one surface of an electrolyte membrane and an oxidant electrode catalyst layer provided on the other surface of the electrolyte membrane so that the two catalyst layers face each other across the electrolyte membrane, and further having diffusion layers provided outside the respective catalyst layers sandwiching the electrolyte membrane therebetween, and such structure serves as one unit, i.e., a so-called unit cell. A common fuel cell system uses a cell stack having a plurality of such unit cells stacked therein so as to obtain a desired amount of electric power. Electric power is generated by supplying raw materials, such as hydrogen and oxygen (hereinafter also referred to as source gases or reactant gases), to each catalyst layer.

When generating electric power at the fuel cell by using hydrogen as a fuel gas to be supplied to the fuel electrode and using air as an oxidant gas to be supplied to the oxidant electrode, hydrogen produces hydrogen ions and electrons at the fuel electrode. The produced electrons travel through an external terminal and external circuit and reach the oxidant electrode. At the oxidant electrode, water is produced from: oxygen included in the supplied air; hydrogen ions that have passed through the electrolyte membrane; and electrons that have reached the oxidant electrode through the external circuit. Through these electrochemical reactions occurring at the fuel electrode and the oxidant electrode, the fuel cell functions as an electric cell.

In many fuel cell systems, an output drawn from the fuel cell is not constant. The fuel cell has a voltage varying according to an output drawn from the fuel cell, and the fuel cell voltage decreases when the output drawn from the fuel cell increases. If an oxide film formed on the surface of the oxidant electrode catalyst is reduced upon a decrease of the voltage, a metallic component (e.g., platinum supported on carbon) in the catalyst will be eluted when the fuel cell voltage again increases (when the output drawn from the fuel cell decreases).

To respond to the above, Patent Document 1, indicated below, proposes a fuel cell system aimed at suppressing the elution of catalysts, such as platinum, occurring due to changes in the output of the fuel cell. The fuel cell system disclosed in Patent Document 1 comprises an output control means for supplying electric power to a motor from a fuel cell and from a secondary battery and controlling the output of the fuel cell based on the SOC (State of Charge) of the secondary battery. If the SOC of the secondary battery is greater than 10%, the output control means limits the output of the fuel cell so that the fuel cell voltage does not go below a predetermined voltage. It is stated that this fuel cell system can suppress degradation caused by the elution of catalysts (e.g., platinum) in the oxidant electrode due to changes in the fuel cell voltage.

PRIOR ART REFERENCE

Patent Document

Patent Document 1: JP2007-220323 A

SUMMARY OF THE INVENTION

Problem to be Solved by the Invention

In the fuel cell system described in Patent Document 1, a power shortage caused by limiting the output of a fuel cell is covered by a secondary battery serving as an energy charge/discharge means. To be more specific, as described in paragraph 0031 of Patent Document 1, at the initial stage of operation, power supply to a motor is performed mainly from the secondary battery so as to make the power supplied from the fuel cell to the motor small. The output of the fuel cell is controlled so as to be equal to or lower than a predetermined output in order for the fuel cell voltage not to go below a predetermined voltage (0.8 V), thereby maintaining the fuel cell voltage, in particular, the potential of the oxidant electrode, at a high value. Here, the remainder of the power required from the motor is supplied by the secondary battery. By maintaining the fuel cell voltage at a high value, the oxidant electrode can be held at a high potential, thereby enabling suppression of the reduction of the oxide film formed on the surface of platinum on the oxidant electrode as well as suppression of the elution of such platinum even when the fuel cell voltage increases thereafter.

In Patent Document 1, the state of charge of the secondary battery is detected, so as to determine whether the detected state of charge is 10% or less of the state of charge of the secondary battery under a fully-charged condition. If the state of charge of the secondary battery is 10% or less, the power supply to the motor is performed mainly from the fuel cell. In other words, limiting the output of the fuel cell is cancelled and the output of the fuel cell is controlled according to the power required from the motor.

Since the fuel cell system disclosed in Patent Document 1 uses power from the secondary battery from the start, for the purpose of suppressing the elution of platinum as a catalyst, power from the secondary battery is prioritized even if the fuel cell actually has available capacity for supplying a certain output for the required output while maintaining its voltage higher than the predetermined voltage. As a result, if there is a request from a load which varies up and down across the predetermined voltage in the state where the secondary battery has a state of charge of 10% or less, support by the secondary battery is not possible and the fuel cell voltage is likely to vary up and down across the predetermined voltage. If such variation of the fuel cell voltage across the predetermined voltage occurs frequently, elution and deposition of platinum will occur repeatedly, and platinum will aggregate around the catalyst carrier and this will reduce catalytic activity and durability.

Thus, the fuel cell system described in Patent Document 1 has a problem to be solved, as follows: the state of charge of the secondary battery decreases at an early stage to the extent that the secondary battery is not able to support the output of the fuel cell, and thus, it is not possible to receive support from the secondary battery appropriately when there is a need to suppress variations in the fuel cell voltage.

The present invention has been made in view of the above-described problem. An object of the present invention is to provide a fuel cell system having a fuel cell and a secondary battery, which can reduce the load applied to the secondary battery wherever possible so that the secondary battery can support the fuel cell in order to prevent the elution of a catalyst at a suitable timing.

Means for Solving the Problem

In order to solve the above-described problem, a fuel cell system according to the present invention comprises: a fuel cell including a fuel electrode and an oxidant electrode, each electrode having a catalyst and being arranged to sandwich an electrolyte membrane therebetween; a secondary battery capable of being charged with electricity and discharging electricity; a load electrically connected to the fuel cell and the secondary battery; and an output supply part that supplies a power, a voltage or a current corresponding to any of a required power, a required voltage and a required current from the load by adjusting a power, a voltage or a current supplied from the fuel cell and a power, a voltage or a current supplied from the secondary battery. If the required power, the required voltage or the required current has reached a boundary power, a boundary voltage or a boundary current, the boundary power, the boundary voltage and the boundary current being an oxidation-reduction power, an oxidation-reduction voltage and an oxidation-reduction current of the catalyst of the fuel cell, respectively, the output supply part performs crossover-avoidance control that holds an FC instruction power, an FC instruction voltage or an FC instruction current for the fuel cell at the boundary power, the boundary voltage or the boundary current, and absorbs a gap between the required power and the FC instruction power, a gap between the required voltage and the FC instruction voltage or a gap between the required current and the FC instruction current, by way of power discharge from the secondary battery or power storage in the secondary battery.

According to the present invention, if at least one of the following conditions is satisfied: the required power reaches the boundary power; the required voltage reaches the boundary voltage; or the required current reaches the boundary current, the output supply part performs the crossover-avoidance control involving at least one of the following: holding the FC instruction power for the fuel cell at the boundary power; holding the FC instruction voltage at the boundary voltage; and holding the FC instruction current at the boundary current. Accordingly, it is possible to suppress the FC instruction power, the FC instruction voltage or the FC instruction current from crossing over the oxidation-reduction power, the oxidation-reduction voltage or the oxidation-reduction current of the catalyst of the fuel cell. The catalyst is eluted when the power is higher than the oxidation-reduction power, the voltage is higher than the oxidation-reduction voltage or the current is higher than the oxidation-reduction current; whereas, the catalyst is deposited when the power is lower than the oxidation-reduction power or the voltage is lower than the oxidation-reduction voltage. Thus, by controlling the power, voltage or current so as not to vary across the oxidation-reduction power, the oxidation-reduction voltage or the oxidation-reduction current, aggregation due to elution and deposition of the catalyst can be suppressed.

Furthermore, according to the present invention, the crossover-avoidance control that holds the FC instruction voltage at the boundary voltage is performed when the required voltage has reached the boundary voltage. Accordingly, if, for example, the required voltage is maintained within the range from an open circuit voltage (OCV) to the boundary voltage, the FC instruction voltage can be set as required in the required voltage and the power in the secondary battery is not used wastefully. If the required voltage has reached the boundary voltage from a higher voltage side, the FC instruction voltage is held at the boundary voltage and excess power is supplied to the secondary battery, so as to be able to absorb the gap between the required voltage and the FC instruction voltage. On the other hand, if the required voltage has reached the boundary voltage from a lower voltage side, the FC instruction voltage is held at the boundary voltage and power corresponding to the shortage is supplied by the secondary battery so as to be able to absorb the gap between the required voltage and the FC instruction voltage. Note that control may be performed by replacing the relationship between the required voltage and the boundary voltage with relationships in power or current. More specifically, the crossover-avoidance control may be performed if the required power has reached the boundary power corresponding to the boundary voltage or if the required current corresponding to the required power has reached the boundary current corresponding to the boundary voltage.

Further, while performing the crossover-avoidance control in the fuel cell system according to the present invention, it is also preferable for the output supply part to set a virtual required power obtained by introducing a time delay to the required power, a virtual required voltage obtained by introducing a time delay to the required voltage, or a virtual required current obtained by introducing a delay to the required current, and to cancel the crossover-avoidance control if a power, a voltage or a current corresponding to the virtual required power, the virtual required voltage or the virtual required current has reached the boundary power, the boundary voltage or the boundary current.

As described above, the present invention performs the crossover-avoidance control that holds the FC instruction voltage (FC instruction power or FC instruction current) at the boundary voltage (boundary power or boundary current) when the required voltage (required power or required current) has reached the boundary voltage (boundary power or boundary current). This crossover-avoidance control uses the secondary battery to absorb the gap between the required voltage (required power or required current) and the FC instruction voltage (FC instruction power or FC instruction current), and there may be some cases where the crossover-avoidance control should be cancelled, in view of the capacity of the secondary battery, even if the condition for starting the crossover-avoidance control continues to be met. The above-described preferred mode is configured so as to set a virtual required voltage obtained by introducing a time delay to the required voltage (or a virtual required power obtained by introducing a time delay to the required power, or a virtual required current obtained by introducing a time delay to the required current), and to cancel the crossover-avoidance control at a timing when such virtual required voltage (or virtual required power or virtual required current) has reached the boundary voltage. With this configuration, even if the required voltage (required power or required current) varies up and down across the boundary voltage (boundary power or boundary current) in a short period of time, the FC instruction voltage (FC instruction power or FC instruction current) can be prevented from excessively following such variation. More specifically, for example, if the required voltage (required power or required current) crosses over the boundary voltage (boundary power or boundary current) from a higher voltage side (higher power side or higher current side), but if the required voltage (required power or required current) returns to the higher voltage side (higher power side or higher current side) after a short time interval, the control for preventing the FC instruction voltage (FC instruction power or FC instruction current) from crossing over the boundary voltage (boundary power or boundary current) can be achieved by cancelling the crossover-avoidance control at a timing when the virtual required voltage (virtual required power or virtual required current) has reached the boundary voltage (boundary power or boundary current).

Further, while performing the crossover-avoidance control in the fuel cell system according to the present invention, it is also preferable for the output supply part to cancel the crossover-avoidance control if a remaining capacity for discharging or charging of the secondary battery exceeds a predetermined remaining capacity threshold.

As already described above, in the present invention, there may be some cases where the crossover-avoidance control should be cancelled, in view of the capacity of the secondary battery, even if the condition for starting the crossover-avoidance control continues to be met. In the preferred mode described above, the crossover-avoidance control is cancelled if the remaining capacity for discharging or charging of the secondary battery exceeds a predetermined threshold and, as a result, the control for suppressing the elution of the catalyst can be performed without applying excess burden to the secondary battery.

Further, in the fuel cell system according to the present invention, it is also preferable for the output supply part to change the remaining capacity threshold according to a rate of variation of the required power, the required voltage or the required current.

By reflecting the rate of variation of the required power, the required voltage or the required current in a set value of the remaining capacity threshold, the above-described preferred mode can further ensure the suppression of excess burden to the secondary battery.

Further, while performing the crossover-avoidance control in the fuel cell system according to the present invention, it is also preferable for the output supply part to cancel the crossover-avoidance control if a rate of variation or a variation range of the required power, the required voltage or the required current exceeds a variation threshold.

In the above preferred mode, the crossover-avoidance control is cancelled if the rate of variation of the variation range of the required power, the required voltage or the required current, or the variation threshold is exceeded. Thus, if, for example, there is a sudden increase in the required power, the above preferred mode can ensure an output accurately following such sudden change in the required power, the required voltage or the required current, thereby suppressing the deterioration of drivability when using the present fuel cell system for driving a vehicle.

Effect of the Invention

The present invention can provide a fuel cell system that can reduce the load applied to the secondary battery whenever possible so that the secondary battery can support the fuel cell for preventing the elution of a catalyst at a suitable timing.

MODE FOR CARRYING OUT THE INVENTION

Hereinafter, embodiments of the present invention will be described with reference to the attached drawings. To facilitate understanding of the descriptions, the same elements will be given the same reference signs wherever possible in each drawing and repetitive descriptions will be omitted.

Figure 1:
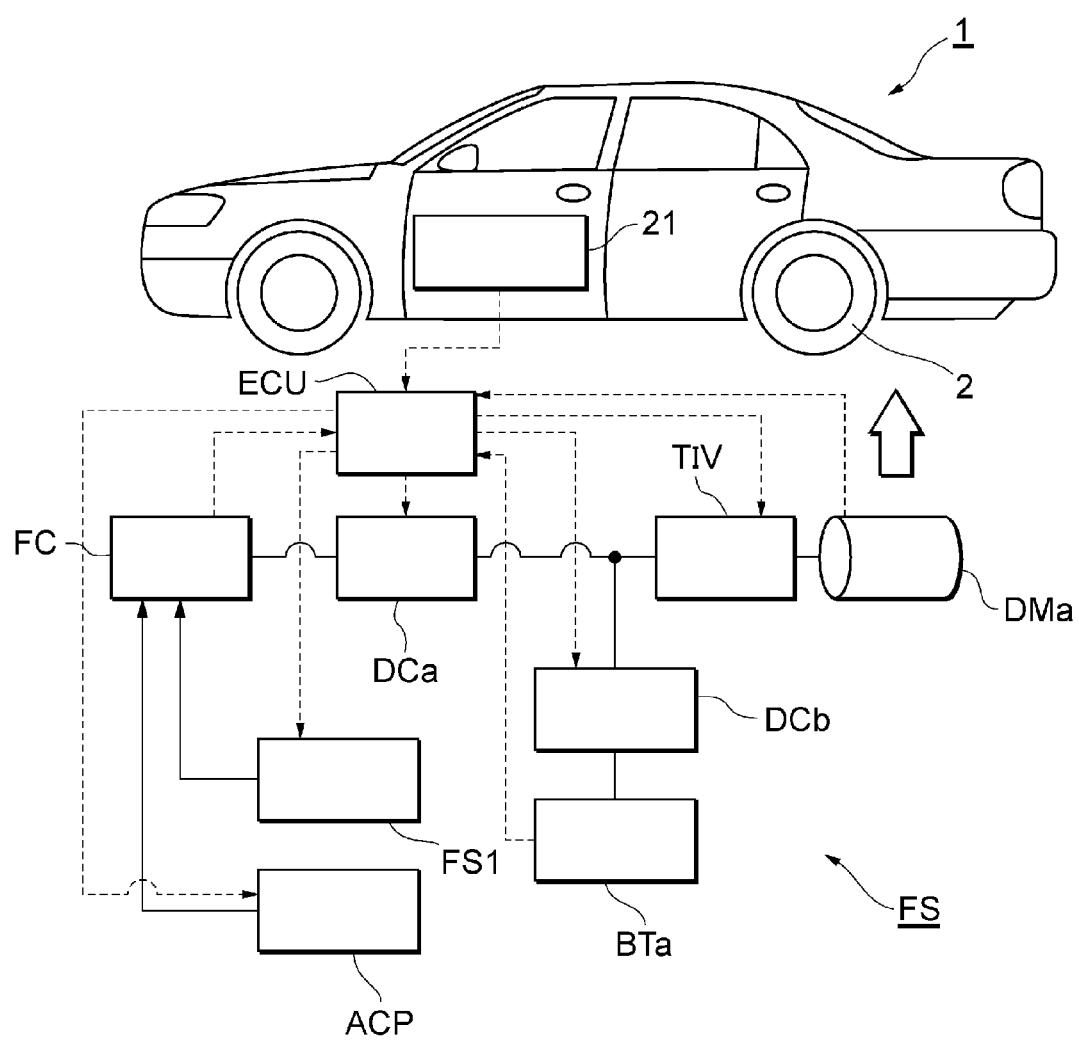
FIG. 1 is a schematic diagram showing the configuration of a fuel cell system according an embodiment of the present invention.

Firstly, a fuel cell system FS to be installed in a fuel cell vehicle according to an embodiment of the present invention will be described with reference to FIG. 1. FIG. 1 is a diagram showing the system configuration of the fuel cell system FS which functions as an on-vehicle power supply system for a fuel cell vehicle. The fuel cell system FS is a system to be installed on a fuel cell car (FCHV) 1 and the system drives wheels 2.

The fuel cell system FS includes a fuel cell FC, an air compressor ACP, a high-pressure hydrogen tank FS1, an FC boost converter DCa, a battery boost converter DCb, a secondary battery BTa, a traction inverter TIV, a drive motor DMa, and a controller ECU.

The fuel cell FC is configured as a solid polymer electrolyte-type cell stack in which numerous cells (each being a single cell (power generating element) having an anode, a cathode and an electrolyte) are stacked in series. In the fuel cell FC under normal operation, an oxidation reaction shown by formula (1) occurs at the anode while a reduction reaction shown by formula (2) occurs at the cathode, and an electrogenic reaction shown by formula (3) occurs in the fuel cell FC as a whole.

$$H_2 \rightarrow 2H^+ + 2e^- \qquad (1)$$

$$(\tfrac{1}{2})O_2 + 2H^+ + 2e^- \rightarrow H_2O \qquad (2)$$

$$H_2 + (\tfrac{1}{2})O_2 \rightarrow H_2O \qquad (3)$$

The fuel gas supplied from the high-pressure hydrogen tank FS1 to the fuel cell FC contributes to the electrogenic reaction within the fuel cell FC and is discharged from the fuel cell FC as an off-gas.

The high-pressure hydrogen tank FS1 stores hydrogen gas at a high pressure (e.g., 35 MPa to 70 MPa).

The air taken in through the operation of the air compressor ACP: is supplied to the fuel cell FC; contributes to the electrogenic reaction within the fuel cell FC; and is discharged from the fuel cell FC as an off-gas.

The FC boost converter DCa increases the voltage of direct-current power generated by the fuel cell FC and supplies the power to the traction inverter TIV. With this voltage conversion control by the FC boost converter DCa, the operation point (output terminal voltage, output current) of the fuel cell FC is controlled.

The battery boost converter DCb has functions of: increasing the voltage of direct-current power supplied from the secondary battery BTa and outputting the power to the traction inverter TIV; and decreasing the voltage of direct-current power generated by the fuel cell FC or the voltage of regenerative power collected by the drive motor DMa through regenerative braking and charging the secondary battery BTa with the power. With these functions of the battery boost converter DCb, charging/discharging of the secondary battery BTa is controlled.

The secondary battery BTa serves as: a source for storing excess power; a source for storing regenerative energy during regenerative braking; and an energy buffer when the load varies due to acceleration or deceleration of the fuel cell vehicle. Secondary batteries, such as nickel-cadmium batteries, nickel-hydrogen batteries and lithium secondary batteries, etc., may be suitably used for the secondary battery BTa.

The traction inverter TIV is connected to the drive motor DMa. The traction inverter TIV is, for example, a PWM inverter which is driven by a pulse width modulation method. In response to control commands from the controller ECU, the traction inverter TIV converts a direct-current voltage output from the fuel cell FC or the secondary battery BTa to a three-phase alternating-current voltage, thereby controlling the rotation torque of the drive motor DMa. The drive motor DMa is, for example, a three-phase alternating-current motor and constitutes a power source of the fuel cell vehicle.

The fuel cell system FS has the controller ECU as an overall control means. The controller ECU is a computer system including a CPU, ROM, RAM and an input/output interface, and the controller ECU controls each part of the fuel cell system FS. For example, when receiving an ignition signal IG output from an ignition switch, the controller ECU starts operating the fuel cell system FS. After that, the controller ECU determines required power from the entire fuel cell system FS based on, for example, signals ACC output from an accelerator sensor 21 regarding the degree of opening of the accelerator and signals VC output from a vehicle speed sensor regarding the speed of the vehicle. The required power from the entire fuel cell system FS is a sum of the power for driving the vehicle and the power for auxiliary devices.

Here, the power for auxiliary devices includes, for example, power consumed by on-vehicle auxiliary devices (humidifier, air compressor, hydrogen pump, cooling water circulation pump, etc.), power consumed by devices necessary for driving the vehicle (transmission, wheel controller, steering device, suspension, etc.) and power consumed by devices arranged in the passenger space (air conditioner, lighting devices, audio system, etc.).

The controller ECU determines an output power distribution between the fuel cell FC and the secondary battery BTa. The controller ECU controls each part so that the power generated by the fuel cell FC corresponds to a target power and also controls the operation point (output terminal voltage, output current) of the fuel cell FC by controlling the FC boost converter DCa.

Further, in order to obtain a target torque according to the degree of opening of the accelerator, for example, the controller ECU outputs, as switching commands, respective alternating-current voltage command values for the U-, V- and W-phases to the traction inverter TIV, and controls the output torque and rotation speed of the drive motor DMa.

Figure 2:
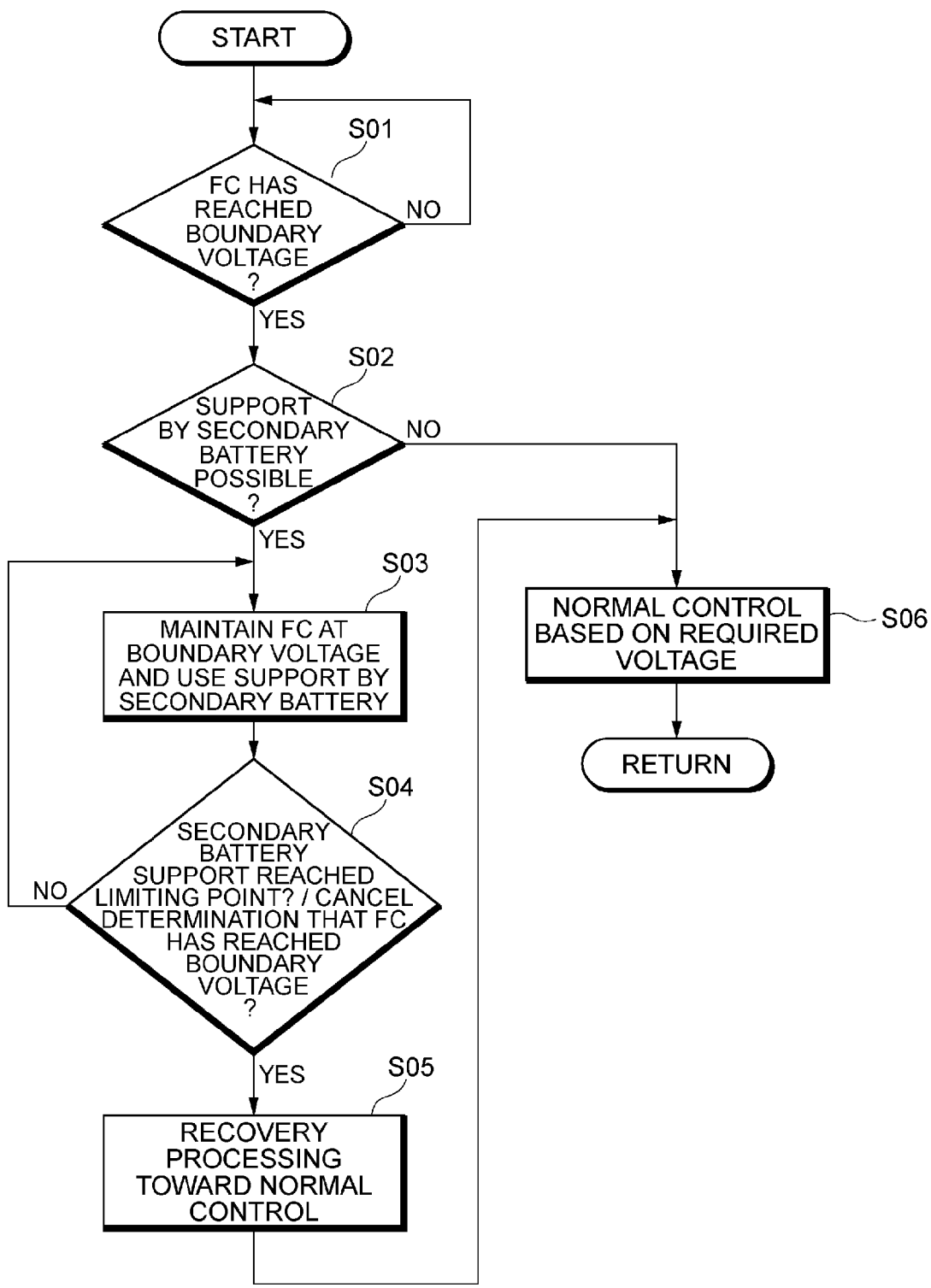
FIG. 2 is a flowchart showing an example of actions of the fuel cell system shown in FIG. 1.

Next, an example of operation control of the fuel cell system FS according to the present embodiment will be described with reference to FIG. 2. FIG. 2 is a flowchart showing an example of actions of the fuel cell system FS shown in FIG. 1. In the below description, unless expressly specified otherwise, each action will be performed by the controller ECU (output supply part) of the fuel cell system FS.

In step S01, a judgment is made as to whether or not an FC instruction voltage for the fuel cell FC has reached a boundary voltage. This FC instruction voltage is a voltage corresponding to a required power from the drive motor DMa acting as a load or from the air compressor ACP, etc. As already described above, in response to the required power from the load, necessary power is supplied by adjusting power generated by the fuel cell and power supplied from the secondary battery BTa; however, in step S01, which is the initial stage of operation, only the power supplied from the fuel cell FC is used.

The boundary voltage in the present embodiment refers to an oxidation-reduction potential of platinum which constitutes the catalyst of the fuel cell FC. When saying that the FC instruction voltage for the fuel cell FC reaches the boundary voltage, the FC instruction voltage decreases from a value higher than the boundary voltage and reaches the boundary voltage in some cases. In other cases, the FC instruction voltage increases from a value lower than the boundary voltage and reaches the boundary voltage.

In step S01, the judgment is repeated if the FC instruction voltage for the fuel cell FC does not reach the boundary voltage. If the FC instruction voltage for the fuel cell FC has reached the boundary voltage, the controller ECU proceeds to step S02.

In step S02, a judgment is made as to whether or not support by the secondary battery BTa is possible. The fuel cell system FS according to the present embodiment prevents, wherever possible, the FC instruction voltage for the fuel cell FC from crossing over the boundary voltage, so as to reduce variations in the number of occurrences of such crossover. If the FC instruction voltage for the fuel cell FC has reached the boundary voltage and if that FC instruction voltage has decreased from a voltage higher than the boundary voltage, power is supplied from the secondary battery BTa (power discharge). On the other hand, if the FC instruction voltage for the fuel cell FC has reached the boundary voltage and if that FC instruction voltage has increased from a voltage lower than the boundary voltage, excess power is absorbed by the secondary battery BTa (power storage). In step S02, the variation profile (increasing or decreasing) of the FC instruction voltage for the fuel cell FC is checked and a judgment is made as to whether or not the secondary battery BTa has a corresponding remaining capacity for power storage or power discharge.

If support by the secondary battery BTa is possible in step S02, the controller ECU proceeds to step S03, and if not, the controller ECU proceeds to step S06.

In step S03, the FC instruction voltage for the fuel cell FC is held at the boundary voltage and the power supply is supported by the secondary battery BTa, thereby achieving control for avoiding an occurrence of crossover. More specifically, such crossover-avoidance control is performed by using the secondary battery BTa to absorb the gap between the entire required voltage, which corresponds to the voltage to be supplied to the load, and the FC instruction voltage for the fuel cell FC.

During the crossover-avoidance control in step S03, a judgment is made in step S04 as to whether or not such crossover-avoidance control should be cancelled. This judgment is made based on the state of the secondary battery BTa and is also made based on variations in the FC instruction voltage.

Since the SOC of the secondary battery BTa is monitored, it is possible to make a judgment as to whether the secondary battery BTa is in a state of allowing further power storage or in a state of allowing further power discharge. If it is necessary to absorb excess power by the secondary battery BTa for the above-described crossover-avoidance control, but if the secondary battery BTa has no remaining capacity for power storage, it is determined that the crossover-avoidance control should be cancelled because there is a risk of deterioration of the secondary battery BTa.

If the FC instruction voltage varies so as to deviate from the boundary voltage, in other words, if the FC instruction voltage has reached the boundary voltage from a voltage higher than the boundary voltage and is held for some time at the boundary voltage and, after that, the FC instruction voltage increases again, or if the FC instruction voltage has reached the boundary voltage from a voltage lower than the boundary voltage and is held for some time at the boundary voltage and, after that, the FC instruction voltage decreases again, the possibility of the FC instruction voltage crossing over the boundary voltage decreases and it is accordingly determined that the crossover-avoidance control should be cancelled.

If it is determined in step S04 that the crossover-avoidance control should not be cancelled, step S03 is continued. If it is determined that the crossover-avoidance control should be cancelled, the controller ECU proceeds to step S05.

In step S05, the crossover-avoidance control is cancelled and recovery processing is performed in order to return back to the normal control. For example, if the FC instruction voltage held at the boundary voltage for the crossover-avoidance control has a large gap from the FC instruction voltage under the normal control, such FC instruction voltage is gradually recovered to the FC instruction voltage under the normal control. On the other hand, if the FC instruction voltage held at the boundary voltage for the crossover-avoidance control has a small gap from the FC instruction voltage under the normal control, it is also preferable to immediately recover such FC instruction voltage to the FC instruction voltage under the normal control.

In step S06, the FC instruction voltage is calculated based on the required voltage and the normal control is performed based on the calculated FC instruction voltage.

Figure 3:
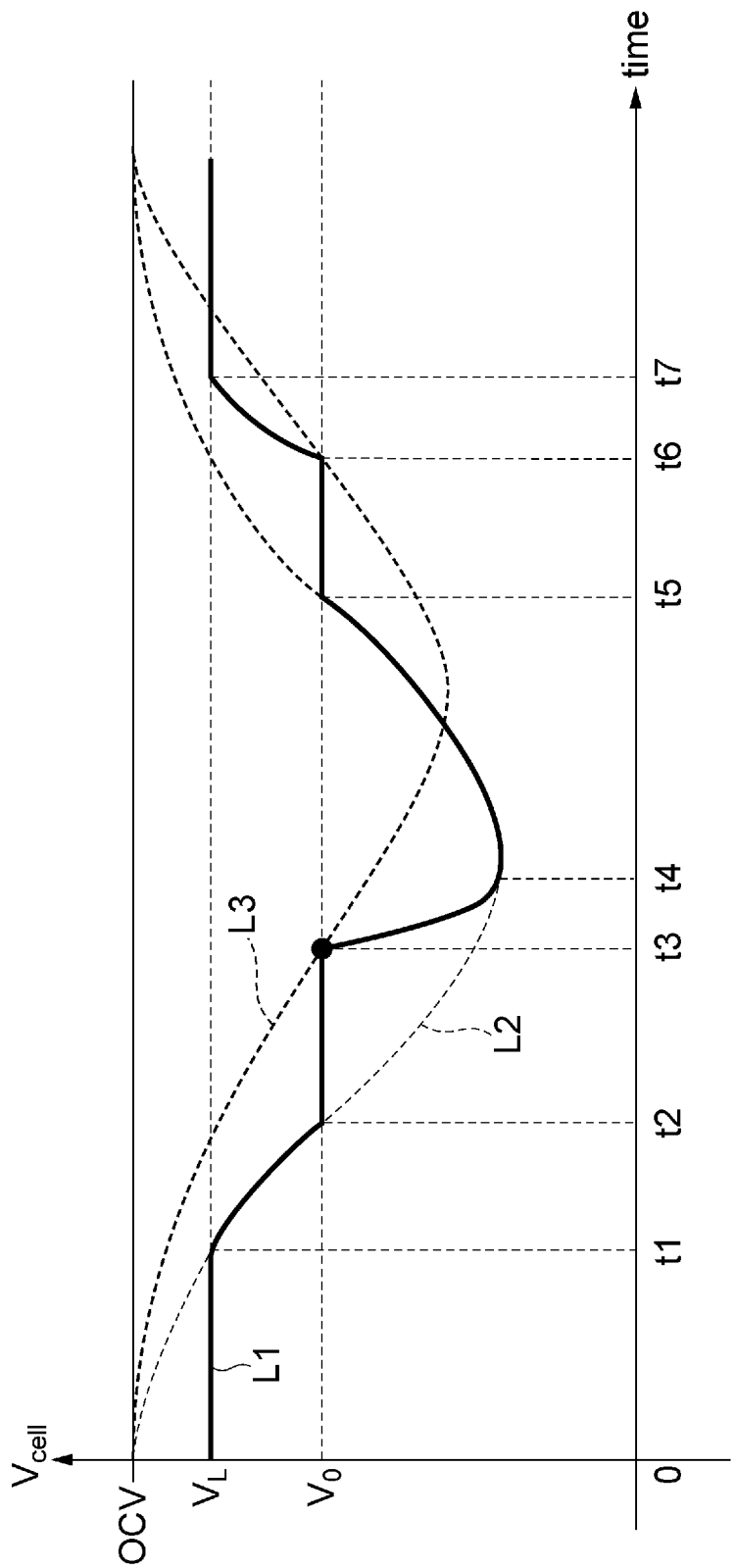
FIG. 3 is a graph showing an example of the variations in voltage of the fuel cell when the fuel cell system shown in FIG. 1 is operated according to the flowchart shown in FIG. 2.

Next, the manner in which the FC instruction voltage varies when the fuel cell system FS of the present embodiment is operated according to the flowchart described above by referring to FIG. 2 will now be described with reference to FIG. 3. FIG. 3 is a graph showing an example of the variations in voltage of the fuel cell when the fuel cell system shown in FIG. 1 is operated according to the flowchart shown in FIG. 2.

In FIG. 3, the vertical axis shows the FC instruction voltage for the fuel cell FC and the horizontal axis shows time. The line L1 represents the FC instruction voltage for the fuel cell FC, the line L2 represents a virtual line corresponding to the required voltage and the line L3 represents a virtual line obtained by introducing a time delay to the line L2.

At the initial stage where the fuel cell system FS is started (time 0 to t1), control for avoiding high potential is performed so that the FC instruction voltage is not at an open circuit voltage (OCV). Accordingly, the FC instruction voltage is held at an upper limit voltage VL. If the line L2 representing the required voltage goes below the upper limit voltage VL, the FC instruction voltage is controlled so as to conform to the line L2. When the line L1 representing the FC instruction voltage has reached the boundary voltage V0 (time t2), the FC instruction voltage is held at the boundary voltage V0 (time t2 to t3).

In the procedure described with reference to FIG. 2, the crossover-avoidance control is determined to be cancelled if support by the secondary battery BTa has reached a limiting point or if the FC instruction voltage varies so as to deviate from the boundary voltage V0. As an example of such determination, it is also preferable to make such determination by introducing a certain time delay to the required voltage. In FIG. 3, the line L3 is a virtual line obtained by introducing a time delay to the line L2. If the degree of delay of the line L3 relative to the line L2 is adapted to the properties of the fuel cell system FS, it is possible to detect the limiting point of the support by the secondary battery BTa in advance, and if the required voltage decreases to below the boundary voltage V0 and immediately increases after that, it is possible to detect such variation in the required voltage. In the present embodiment, the line L3 goes below the boundary voltage V0 at time t3 and the crossover-avoidance control is accordingly cancelled at time t3. After that, at time t4, the fuel cell system proceeds to the normal control based on the required voltage.

The FC instruction voltage increases after time t4. When the increasing FC instruction voltage has reached the boundary voltage V0 (time t5), the FC instruction voltage is held at the boundary voltage V0 and the crossover-avoidance control is resumed (time t5 to t6). After that, the line L3 goes above the boundary voltage V0 at time t6, and thus, the crossover-avoidance control is cancelled at time t6.

As described above, when the required voltage, which corresponds to the required power, has reached the boundary voltage V0, which is the boundary between a low-voltage state where the oxide film formed on the surface of the metal constituting the catalyst of the fuel cell FC is reduced and a high-voltage state where the metal constituting the catalyst of the fuel cell FC is oxidized to form an oxide film, the present embodiment performs the crossover-avoidance control that holds the FC instruction voltage for the fuel cell FC at the boundary voltage V0, and absorbs the gap between the required voltage and the FC instruction voltage by using the secondary battery BTa.

In the present embodiment, since the controller serving as an output supply part performs the crossover-avoidance control that holds the FC instruction voltage for the fuel cell FC at the boundary voltage V0 when the required voltage has reached the boundary voltage V0, it is possible to suppress the FC instruction voltage from crossing over the oxidation-reduction potential of platinum, which constitutes the catalyst of the fuel cell FC. The catalyst is eluted at a potential higher than the oxidation-reduction potential and is deposited at a potential lower than the oxidation-reduction potential. Thus, aggregation due to elution and deposition of the catalyst can be suppressed by controlling the voltage so that it does not vary across the oxidation-reduction potential.

Further, in the present embodiment, the crossover-avoidance control that holds the FC instruction voltage at the boundary voltage V0 is performed when the required voltage has reached the boundary voltage, and accordingly, if, for example, the required voltage is maintained within the range from an open circuit voltage (OCV) to the boundary voltage V0, the FC instruction voltage can be set as required in the required voltage, and the power of the secondary battery BTa will not be used wastefully. If the required voltage has reached the boundary voltage V0 from a higher voltage side, the FC instruction voltage is held at the boundary voltage V0 and excess power is supplied to the secondary battery BTa, so as to be able to absorb the gap between the required voltage and the FC instruction voltage. On the other hand, if the required voltage has reached the boundary voltage V0 from a lower voltage side, the FC instruction voltage is held at the boundary voltage V0 and power corresponding to the shortage is supplied by the secondary battery BTa, so as to be able to absorb the gap between the required voltage and the FC instruction voltage.

Further, in the present embodiment, while performing the crossover-avoidance control, the virtual required voltage L3 obtained by introducing a time delay to the required voltage L2 is set and when the virtual required voltage L3 reaches the boundary voltage V0, the crossover-avoidance control is cancelled (see FIG. 3 and the related description). This control can also be made based on a virtual required current corresponding to the virtual required voltage L3 or virtual required voltage. Using a virtual required power is more preferable.

As described above, the present embodiment performs the crossover-avoidance control that holds the FC instruction voltage at the boundary voltage V0 when the required voltage has reached the boundary voltage V0. This crossover-avoidance control uses the secondary battery to absorb the gap between the required voltage and the FC instruction voltage, and there are some cases where the crossover-avoidance control should be cancelled, in view of the capacity of the secondary battery BTa, even if the condition for starting the crossover-avoidance control continues to be met. Thus, the present embodiment is configured so as to set a virtual required voltage (line L3 in FIG. 3) obtained by introducing a time delay to the required voltage, and to cancel the crossover-avoidance control at a timing when the virtual required voltage has reached the boundary voltage V0. With this configuration, even if the required voltage varies up and down across the boundary voltage V0 in a short period of time, the FC instruction voltage can still be prevented from excessively following such variation. More specifically, for example, if the required voltage crosses over the boundary voltage V0 from a higher voltage side, but if it returns to the higher voltage side after a short time interval, the control for preventing the FC instruction voltage from crossing over the boundary voltage V0 can be achieved by cancelling the crossover-avoidance control at a timing when the virtual required voltage reaches the boundary voltage V0.

Further, in the present embodiment, while performing the crossover-avoidance control, the crossover-avoidance control is cancelled if a remaining capacity for discharging or charging of the secondary battery BTa exceeds a predetermined remaining capacity threshold (see step S04 in FIG. 2 and the related description).

As described above, in the present embodiment, there may be some cases where the crossover-avoidance control should be cancelled, in view of the capacity of the secondary battery BTa, even if the condition for starting the crossover-avoidance control continues to be met. Thus, by cancelling the crossover-avoidance control if the remaining capacity for discharging or charging of the secondary battery BTa exceeds a predetermined remaining capacity threshold, it is possible to perform the control for suppressing the elution of the catalyst without applying excess burden to the secondary battery BTa.

Further, in the present embodiment, it is also preferable to change such remaining capacity threshold according to a rate of variation of the required power. By reflecting the rate of variation of the required power in a set value of the remaining capacity threshold, this preferred mode can further ensure the suppression of excess burden to the secondary battery BTa.

Further, in the present embodiment, while performing the crossover-avoidance control, it is also preferable to cancel the crossover-avoidance control if a rate of variation or a variation range of the required power exceeds a variation threshold. This preferred mode cancels the crossover-avoidance control if the rate of variation of the variation range of the required power or the variation threshold is exceeded, and thus, if, for example, there is a sudden increase in the required power, it is possible to ensure an output accurately following such sudden change in the required power, thereby suppressing the deterioration of drivability when using this fuel cell system FS for driving a vehicle.

The present embodiment describes an example where control is performed based on the required voltage, the FC instruction voltage, the boundary voltage and the virtual required voltage, etc., but it is also possible and preferable to perform control based on power or current. In that case, power-based control using required power, FC instruction power, boundary power, and virtual required power, etc., current-based control using required current, FC instruction current, boundary current, and virtual required current, etc., and any combination of voltage-based, power-based and current-based controls can also be selected.

DESCRIPTION OF REFERENCE NUMERALS

FS: Fuel Cell System
FC: Fuel Cell
FS1: High-pressure Hydrogen Tank
ACP: Air Compressor
DCa: FC Boost Converter
TIV: Traction Inverter
DCb: Battery Boost Converter
DMa: Drive Motor
BTa: Secondary Battery

What is claimed is:
1. A fuel cell system comprising:
a fuel cell including a fuel electrode and an oxidant electrode, each electrode having a catalyst and being arranged to sandwich an electrolyte membrane between the fuel electrode and the oxidant electrode;
a secondary battery configured to be charged with electricity and discharging electricity;
a load electrically connected to the fuel cell and the secondary battery; and
an output supply part that supplies a power, a voltage or a current corresponding to any of a required power, a required voltage and a required current from the load by adjusting a power, a voltage or a current supplied from the fuel cell and a power, a voltage or a current supplied from the secondary battery,
wherein the output supply part is an electronic control unit including a computer having memory,
wherein, if the required power, the required voltage or the required current has reached a boundary power, a boundary voltage or a boundary current, the boundary power, the boundary voltage and the boundary current being an oxidation-reduction power, an oxidation-reduction voltage and an oxidation-reduction current of the catalyst of the fuel cell, respectively, the output supply part performs crossover-avoidance control that holds a fuel cell (FC) instruction power in the output supply part, an FC instruction voltage or an FC instruction current for the fuel cell at the boundary power, the boundary voltage or the boundary current, and absorbs a gap between the required power and the FC instruction power, a gap between the required voltage and the FC instruction voltage or a gap between the required current and the FC instruction current by way of power discharge from the secondary battery or power storage in the secondary battery, and wherein, while performing the crossover-avoidance control, the output supply part sets a virtual required power obtained by introducing a time delay to the required power, a virtual required voltage obtained by introducing a time delay to the required voltage, or a virtual required current obtained by introducing a delay to the required current, and cancels the crossover-avoidance control if a power, a voltage or a current corresponding to the virtual required power, the virtual required voltage or the virtual required current has reached the boundary power, the boundary voltage or the boundary current.

2. The fuel cell system according to claim 1, wherein, while performing the crossover-avoidance control, the output supply part cancels the crossover-avoidance control if a remaining capacity for discharging or charging of the secondary battery exceeds a predetermined remaining capacity threshold.

3. The fuel cell system according to claim 2, wherein the output supply part changes the remaining capacity threshold according to a rate of variation of the required power, the required voltage or the required current.

4. The fuel cell system according to claim 1, wherein, while performing the crossover-avoidance control, the output supply part cancels the crossover-avoidance control if a rate of variation or a variation range of the required power, the required voltage or the required current exceeds a variation threshold.

* * * * *